Patented Nov. 20, 1945

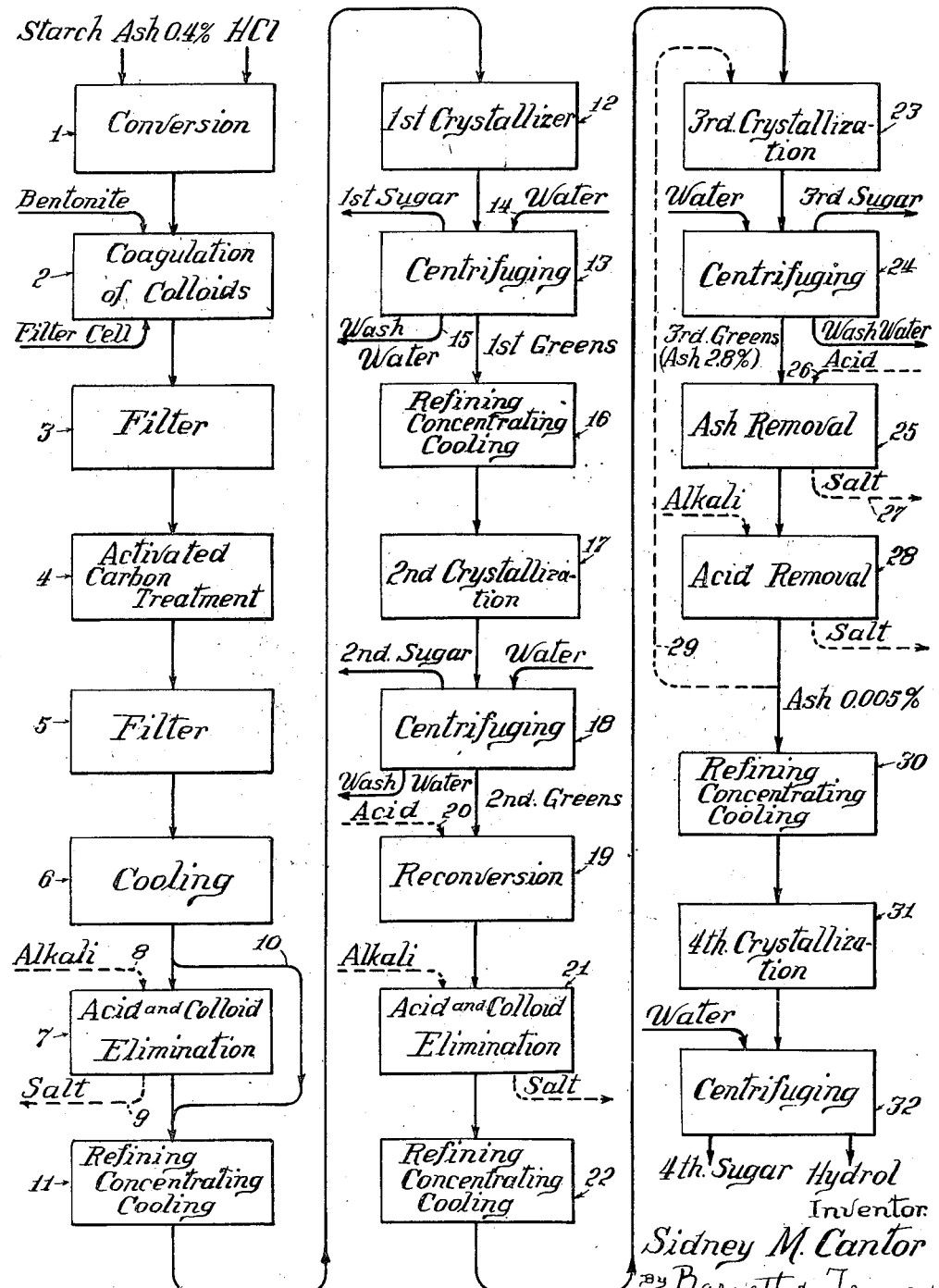

2,389,119

UNITED STATES PATENT OFFICE 2,389,119

PROCESS FOR THE PRODUCTION OF DEXTROSE

Sidney M. Cantor, Riverside, Ill., assignor to Corn Products Refining Company, New York, N. Y., a corporation of New Jersey Application March 24, 1941, Serial No. 384,812

9 Claims. (Cl. 127—40)

This invention relates to the production of dextrose from dextrose polymers, more particularly to the production of high purity, crystalline dextrose from starch converted dextrose solutions in accordance with the principles of United States patents to William B. Newkirk, No. 1,471,347, October 23, 1923, and No. 1,521,830, January 6, 1925; and a primary object of the invention is to provide certain improvements in this art, more particularly in the art of producing high purity, crystalline dextrose, whereby the dextrose content of the liquor or liquors to be crystallized is increased; whereby the time required for the crystallizing operation, or operations (in the case of repeated crystallizations of the same converter liquor), is considerably shortened and the cost of the process thereby reduced; whereby the whiteness and lustre of the crystalline product or products is improved, such improvement being particularly pronounced in the case of second and third sugars; whereby less water is used for washing the centrifuged sugar and consequently less sugar is washed away; whereby for these and other reasons the total yield of crystalline dextrose from a given quantity of converter liquor may be increased; whereby the color removing operation may be carried out with less than the usual amount of adsorptive material, for example, with less bone black per unit of the volume of liquor treated; whereby a second sugar can be produced of a quality substantially equal to first sugars heretofore produced, with consequent economy in equipment; whereby the liquors may be crystallized and centrifuged at lower densities with consequent saving in power; and whereby the value of the "hydrol" or final mother liquor, discharged from the process and usually sold as a by-product, is increased by the absence of the usual relatively large quantities of soluble salts which tend to cause an after crystallization of the dextrose and salt in such liquor.

The invention makes possible the return of mother liquors, after repeated crystallizations, to the process so that, within certain limits, the process may be a cyclic process. It does not appear to be feasible, however, to continue the return of mother liquors to the process indefinitely as, ultimately, a build-up of non-crystallizable substances will take place necessitating draw-off of some hydrol if the process is to be continued profitably.

The purposes of the invention are attained in part by certain procedures whereby the "ash" content of the liquors in process is kept at a minimum. By "ash" is meant soluble salts which appear as ash in the laboratory analyses of the liquors. The invention provides for the removal from the liquors in process of the acidic materials which acidic materials, under ordinary practice, are neutralized, with the production of salts resulting in the ash.

The invention also contemplates, as an optional step, the removal of ash at such stage or stages of the process at which the ash shall have reached a quantity, in proportion to the dextrose, dry substance basis, such that it tends to appreciably interfere with the proper operation of the process. In quantities larger than say about 1.5% the ash slows down crystallization and tends to deform the dextrose crystals.

An important feature of the invention consists in the removal of acidic substances, whether capable of being neutralized to the usual neutralization of pH of 4.5-5.5 or not, which substances are of such character as to give rise to color bodies in the liquors. By removal of these acidic color forming substances the usual adsorption treatment is facilitated, less bone black being used, for example, when bone black is employed for removing color; and the whiteness of the product is enhanced, more particularly in the case of the products from repeated crystallizing operations, so that a second sugar will be practically as white as the ordinary first sugar and hence saleable as a first sugar.

Another important feature of the invention consists in the minimization of colloid formation. The bodies which are responsible, in part at least, for color formation, for example, levulinic acid, hydroxymethylfuroic acid and other degradation products of dextrose originating in the converting operation, tend to polymerize and become colloidal in character, ultimately forming colloid particles of sufficient magnitude to substantially retard crystallization probably by coating the faces of the growing crystals. While the amount of acidic material of this character may be small in comparison with the amount of the converting acid in the liquor, the effect of the colloidal bodies formed therefrom, as above described, in the slowing down of crystallization appears to be disproportionately large. This colloidal formation, according to the present invention, is prevented to a considerable extent by the removal of the acidic materials which tend to polymerize and produce such bodies. The polymerization, when it occurs, takes place by autocatalysis so that the early removal of the acidic material prevents an accumulative building up of the colloids which would otherwise take place in the stages of the process between the converter and the crystallizer.

By substantially reducing the formation of color producing substances, the washing of the centrifuged sugar is facilitated; that is, less water is required, and hence there will be less washing away of sugar from the crystals. This heightens the lustre of the crystals besides increasing net yield. According to processes heretofore used, a spun sugar which before washing may have consisted of 57% of the dextrose in the liquor going to the crystallizer would be ordinarily reduced by washing to about 51%. In accordance with the present invention the net amount of sugar after washing may be as high as 55%. Wash liquor has to be sent back to the process and refined, concentrated and re-crystallized; and the larger its quantity, the larger will have to be the equipment necessary in order that the same quantity of finished sugars should be produced.

Another important feature of the invention is that liquors sent to the crystallizers (after conversion of starch or reconversion of mother liquors) will have a higher dextrose content than heretofore. For example, under former processes involving the neutralization of acids with soda ash, the dextrose content of a starch converted neutralized liquor would ordinarily be about 85% (84%–86%); whereas, with the present process the dextrose content will ordinarily be about 87% (85%–88%). The relatively smaller amount of dextrose in the soda ash neutralized liquor is due to destruction of some of the dextrose during the neutralizing operation wherein some parts of the liquor are over-neutralized to such an extent as to cause the destruction of dextrose by the alkali. The pH of a neutralized liquor is ordinarily an average pH obtained by under-neutralizing portions of the liquor and over-neutralizing other portions. In the process of the present invention there is no neutralization of the acid, in the ordinary sense of the word, and, therefore, no possibility of destruction of dextrose from this cause.

Another advantage of the invention is that it makes possible the production of a second sugar which, because of its purity, and more particularly because of its whiteness and, to some extent because of the absence of ash, will be substantially equal to first sugars as heretofore produced and can be sold as a first sugar. Heretofore it has been the practice to melt second sugars and return them to the process for refining, concentration and recrystallization. These re-treatments involve, of course, an economic loss.

Another important advantage of the invention is that it makes possible a larger number of crystallizations of the same converter liquor. Heretofore because of the building up of the ash, more particularly, the process has been limited practically to two crystallizations.

Another advantage of the process of the present invention is that the final hydrol will contain only a negligible quantity of ash. This gives the hydrol a greater value because the usual high ash contents of hydrols bring about after crystallizations, particularly of dextrose sodium chloride, which take place in the tank cars or other receptacles in which the hydrol may be transported or kept. The hydrol of the present invention is also lighter in color than ordinary hydrols.

The advantages of the present invention are of particular value (although the invention is not limited to this feature) when employed in a dextrose process such as disclosed in United States patent to Copland, No. 2,109,585, March 1, 1938, in which the mother liquor from the first crystallization (first greens) is reconverted, for the purpose of increasing the dextrose content, by de-polymerization of the higher molecular weight non-crystallizable sugars (which are polymerization products of dextrose) back to dextrose; such process (or processes employing reconversion at any stage) involving the use of additional hydrolyzing acid for the converting operation, and hence resulting in a larger salt content in the reconverted liquors, that is, if the usual neutralization procedure is followed.

The accompanying drawing is a flow sheet illustrating the principles of the present invention as applied to a process of the general type shown in the above mentioned Copland patent. It will be understood, however, that such application of the invention to practice is merely preferential and illustrative and that the invention is not to be considered as limited to this particular type of process; the intention being to cover by patent all equivalents of the procedures described and also all modifications thereof and all operations within the scope of the hereto appended claims.

This application is a continuation in part of application Serial No. 325,036, filed March 20, 1940, issued August 31, 1943, as U. S. Patent No. 2,328,191.

It has been the custom for many years in the production of conversion products of starch, such as corn syrup (commonly called glucose) and converter liquors for the so-called 70 and 80 corn sugars and for high purity crystalline dextrose, to use hydrochloric acid as the hydrolyzing acid in the converting operation and to neutralize the acid in the converter liquor with an alkaline substance, usualy sodium carbonate. This results in the formation of sodium chloride which is soluble and hence remains in the liquor throughout the process being finally discharged from the process in solution in the hydrol. The amount of the salt is, of course, increased by further neutralizations in case mother liquors are reconverted. This salt, and other salts to be referred to hereinafter, are objectionable for several reasons: they tend to promote and increase the polymerization of dextrose to the higher molecular weight sugars during the converting operations; they tend to inhibit the de-polymerization of the higher molecular weight sugars to dextrose in reconverting operations; they accumulate in increasing quantities (in proportion, that is, to dextrose on dry substance basis) as the process continues, so as to limit the number of possible crystallizing operations without contamination of the dextrose with dextrose sodium chloride, which will ordinarily take place if the salt is present in the liquor in quantities of about 7% to 8%, on the dextrose dry substance basis, and finally, they give a high salt content to the hydrol which is undesirable for the reasons above stated.

Furthermore, solutions produced by the acid hydrolysis of dextrose polymers, starch, for example, contain amino acids resulting from the action of the hydrolyzing acid on protein impurities from which starch, for example, is never entirely free. These amino acids react or condense with dextrose and with dextrose dehydration products such as hydroxymethylfurfural, levulinic acid and hydroxymethylfuroic acid to form colored bodies; and this reaction is not prevented by the neutralization of the amino acids because the amino acid salts have, apparently, much the same property of reacting with dextrose dehydration products to form colored substances as do the amino acids themselves.

The converter liquors also contain acidic materials which are not neutralized at the usual neutralization pH of about 4.5-5.5. "Neutralization" in this art, it will be understood, does not mean bringing the liquors to the actual neutralization pH of 7. The liquors are usually kept on the acid side, neutralization ordinarily being carried only to a pH of about 5. At this pH levulinic acid is not converted into a salt and the same appears to be true also of hydroxymethylfuroic acid. These acids, and possibly other acids which can be regarded as dehydration products of dextrose through hydroxymethylfurfural (which latter is formed from dextrose by the action of acids or acid salts) are in themselves not highly colored bodies. However, they appear to react with themselves, by autocatalysis, to form polymers which are colloidal in character and highly colored. These color forming polymers of acidic materials produced in the conversion of the starch play a part both in the inhibiting and slowing down of crystallization and also in the production of color which is quite disproportionate, it would seem, to their quantity in proportion to other materials in the converter liquor. By preventing the formation of these color colloids a whiter dextrose product is obtainable, the time of crystallization is considerably shortened, and the net yield of dextrose considerably increased.

The present invention makes a radical change in the long established practice in the art of producing conversion products of starch whereby elimination of acidic material from converted and/or reconverted liquors is substituted for neutralization of the same by soda ash or other alkaline substance. By "elimination" of acidic material, as the term is used herein, is intended the removal of the acids from the liquors in distinction to changing them into soluble salts in accordance with the practice heretofore in vogue. The invention, however, goes further than this. It eliminates not only the hydrolyzing acid, and other neutralizable acidic material, but also color and colloid forming acidic materials which, in some cases, at least, are not neutralizable at the usual neutralizing pH; or which, if neutralizable, form salts which are themselves to some extent productive of color bodies in the liquors.

It is believed that the description as to the mechanism of color and colloid production given above is correct. But whether this be so or not, it has been demonstrated that applicant's invention removes, not only the hydrolyzing acid but also organic acids such as amino acids, levulinic acid and hydroxymethylfuroic acid, and that this removal results in very appreciable color reduction as well as more rapid and perfect crystallization of the dextrose.

The improved process of the present invention also involves preferably a preliminary removal of colloidal material by treatment of the converted liquor with bentonite or equivalent clay. Bentonite may be defined as a clay "which swells when wetted" (Hackh's Chemical Dictionary, second edition, page 116). This operation takes the place of coagulation of colloids under the old process by neutralization and their removal by means of mud centrifugals which the present process does not need to employ. This preliminary removal of colloids is of particular importance in the process of the present invention in order to make possible the effective treatment of the liquor with the acid removing substance. If this colloidal matter were not removed, it would slime the acid removing substance which is of granular character, preferably, and through which the liquor is passed as in a filtering operation.

The process of the present invention also employs, as an optional step, however, a treatment of the liquor with activated carbon, for the preliminary removal of coloring matter after the bentonite treatment and before the step of acid removal. The advantage of this is that a larger quantity of coloring material can be removed at the low pH than after the pH has been raised by removal of acid.

In accordance with applicant's invention, the acidic materials, of the types above referred to, may be removed from the converter liquor by the use of any known acid removing substance which is inert in respect to, that is, not destructive of, dextrose. The invention is not limited to the use of any particular acid removing substance. Several of such substances are known. They ordinarily operate as filter bodies through which the liquor is passed, the acids or acid radicals in the liquor reacting and forming insoluble compounds with the acid removing substance which, therefore, brings about the actual elimination of the acidic material from the liquor as intended herein in distinction to its neutralization in the ordinary sense of the term.

Particularly suitable for the purposes of the present invention are the amines of sufficiently high molecular weight so that they combine with the acids to form insoluble salts. The term "amine" includes any compound within the generic formula R—N—X wherein N stands for nitrogen, X for two, one or zero hydrogen atoms, and R for an alkyl, aryl, aralkyl or heterocyclic group, either substituted or unsubstituted, or any combination of these groups.

An example of a suitable acid removing substance is the resinous product of m-phenylene diamine and formaldehyde which, with its method of production, is described in United States patent to W. H. Kirkpatrick, No. 2,106,486, January 25, 1938. This product may be considered as an amine, in the broad sense of the term intended herein, because its organic radical can be regarded as displacing hydrogen in ammonia.

Another suitable substance for the purpose of this invention is the product known as "Anex," made by the International Filter Company, which is also an amine, as above defined, responding to the formula R—N—X.

Possible reactions between the acid removing substance and the acid (hydrochloric acid, for example) are illustrated in the following formulas:

(1) 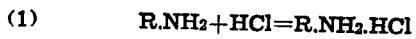 R.NH₂+HCl=R.NH₂.HCl (2)  R.NH₃.OH+HCl=R.NH₃.Cl+HOH

On the latter theory an exchange of anions takes place. The chloride ion of the hydrochloric acid changes place with the OH ion of the acid eliminating substance, which originates from the water and is loosely attached to said acid removing substance.

If the treated liquor contains salts, there is another probable reaction as follows:

(3)  R.NH₃.OH+NaCl=R.NH₃.Cl+NaOH

However, the applicant's invention is not dependent upon the correctness of the above theories as to the mechanism of the acid removal.

The invention also contemplates, as an optional step, the removal of soluble metal salts from the process liquors if and when such salts (ash) are present in quantities to detrimentally affect the crystallizing process. In a process involving the elimination of acidic material, as a substitute for its neutralization, these ash-forming salts enter the system, to a large extent at least, with the starch and water going to the converter. That is, the starch itself contains certain salts natural to the corn, and it picks up additional salts from contact with metals during the process wherein the starch is recovered from the corn. The water in which the starch is suspended in the wet starch system or which is mixed with the starch for conversion purposes also contains mineral salts, as a general rule. If, as is customary, the salt content of the starch liquor going to the converter contains only about 0.4% ash, on dry substance basis, the amount of ash will be so small that it does not materially affect a first crystallizing operation or even subsequent crystallizing operations. Its removal at these stages is possible but is ordinarily not worth the cost. However, as the amount of dextrose in the liquor, after repeated crystallizations, is diminished so that the proportion of ash to dextrose is increased to a point at which the ash detrimentally affects crystallization, that is, when the ash content for practical purposes exceeds 1.5% or thereabouts, based on dry substance dextrose, it becomes desirable to remove the ash; and, according to the present invention, this removal is preferably effected by two successive operations. The first operation employs a base-removing substance which through ion exchange brings about the removal of the cation of the salt and results in the production of an acid. The second operation eliminates the acid in the manner described above for acid elimination from converted or reconverted liquors.

Any suitable compound which reacts with salts to bring about the substitution of a hydrogen cation in the compound for the metal cation of the salt, and which is water insoluble and inert with respect to dextrose, may be used for the purpose of removal of ash from the process liquors in accordance with the present invention. A number of such compounds are known, for example, the product described in United States Patent No. 2,206,007, June 25, 1940, to Otto Liebknecht, assignor to The Permutit Company.

Another suitable substance is Catex, manufactured by the International Filter Company, which is a water insoluble, organic polymer inert to dextrose, having within its molecule a sulfonic acid group, that is, sulfuric acid with an OH replaced by an organic group. The general formula can be considered as R—SO$_2$.OH. The "H" in this formula represents an acidic hydrogen, i. e., hydrogen in an ionizable form. This acidic hydrogen can be made to enter into chemical reaction with the soluble metal salts wherein the metals of the salts combine with the base removing substance with the simultaneous formation of hydrochloric acid; the reaction being as follows:

(4)
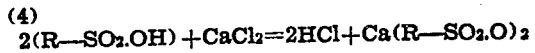

The present invention is not limited to the use of either of the above described base removing substances. For example, instead of using as a base removing substance an organic polymer having within its molecule a sulfonic acid group, as above described, one may employe an R-hydrogen sulfate compound wherein R may be either an alkyl, aryl, aralkyl or heterocyclic group; that is, a substance, the generic formula of which is R—O—SO$_2$.OH. The hydrogen in this compound is also an acid hydrogen which is very reactive and readily displaces the metals in the ash forming salts found in starch converted dextrose solutions. The sulfated high polymer is water insoluble, inert to dextrose, and forms metal salts as in the case of the sulfonic acid type of product.

Similar phosphorus compounds may be used in place of the sulfonic acid or sulfated compounds above mentioned.

A generic formula for all these compounds would be $z(RO_wX_v)H$ wherein R is a high molecular weight polymer of an alkyl, aryl, aralkyl or heterocyclic group; O is oxygen; X sulfur or phosphorus in the form of its oxygenated acid radical; H is reactive hydrogen; and $w$, $v$ and $z$ are whole numbers.

*Example.*—Referring to the hereto annexed flow sheet, a preferred process involving the several improvements of the invention is as follows:

A starch and water suspension having a density of 10.5° Baumé (10°–13° Baumé) and containing a sufficient amount of hydrochloric acid to give it a pH of 1.6 (1.4–1.8) is introduced into the converter 1 and converted at 45 pounds steam pressure, per square inch, for twenty minutes (15–30 minutes) after the pressure has been built up, to give a liquor purity of 90%–91%, "purity" meaning reducing sugar calculated as dextrose, dry substance basis. The starch suspension may contain 0.4% ash, dry substance basis. The conversion above described follows common practice. The figures in parentheses, in this and in the following parts of the description, indicate ranges which are practical and working ranges not critical ranges, unless otherwise specified. The percentages, unless otherwise specified, are on dry substance basis.

The liquor converted at 1 is introduced into a vessel 2 with 0.75% (0.5%–1.0%) of bentonite and 0.4% Filter-Cel, a filter aid distributed by Johns-Manville, both on the basis of dry substance sugar, and the material mixed together for from 5 to 10 minutes to coagulate impurities such as colloids, e. g. fatty acids, proteins and non-sugar carbohydrates. The liquor is then filtered at 3. Its dextrose content (in distinction to "purity," i. e. reducing sugar calculated as dextrose) will be about 87% (85%–88%).

In place of bentonite any clay carrying the same electrical charge, viz. a negative charge, and capable of coagulating the positively charged converter liquor suspended material, could be used; and the term bentonite is intended herein to cover all clays of this type.

The liquor filtered at 3 is preferably treated at 4 with an acid insoluble color removing substance, such as the activated vegetable carbon Darco, and is then filtered at 5. This will reduce the color from, say, 5.8 to 0.4 on the Lovibond scale. The previous treatment of the converter liquor with bentonite to coagulate and remove colloids makes it possible to give the liquor the Darco treatment (and the subsequent acid elimination treatment) at the stages indicated; and at the low pH more color can be removed than later when the pH of the liquor is higher. Bone black could not be used, preferably, at this stage because of the dissolving effect of the acid on the bone phosphate.

The liquor filtered at 5 is then cooled to about 90° F. (90°–110° F.) at 6 and is introduced into a vessel 7 containing the acid removal substance in granular form. In this vessel the acid is removed in an amount to give the liquor a pH of about 5 (4.5–5.5). The acid removing material also acts, because of its granular state, as an adsorption material to remove residual colloids. Without the previous bentonite treatment which removes most of the colloids, it would be difficult to effectively treat the liquor in the acid removing step. Under the process involving neutralization, the colloids are rendered filterable by the coagulating effect of the neutralizing agent. The bentonite treatment is a substitute for neutralization in this respect.

The acid and colloid eliminating material has to be regenerated at intervals, alkali being introduced at 8, and the resulting soluble salt discharged at 9.

When starting the liquor on a fresh or on a freshly regenerated bed of acid removing material, the liquor will come out in an alkaline state. This is not due to residual alkali from the regeneration step but to removal of the anion in the neutral salts in the starch in accordance with Formula 3 above.

As alkaline solutions are destructive of dextrose, the alkalinity should be immediately reduced to the desired pH of about 5. A convenient method of doing this is to by-pass some of the clarified acid liquor around the acid eliminating cell 7 as indicated by the line 10.

The liquor freed from its acidic material is then given the usual refining, concentrating and cooling operation at 11, involving, preferably, the use of light and finishing vacuum pans followed in each case by filtration through bone black or equivalent adsorption treatment. The concentrated liquor which may have a density of 39° Baumé (37.5°–41.5° Baumé) is cooled and introduced into the first crystallizer 12; the practice followed being in substance the now customary crystallization in motion process described in the Newkirk Patent No. 1,521,830, referred to above. The crystallizer is provided with a slow moving agitator and with a water jacket to cool the massecuite. The liquor is introduced upon foots from a previous crystallizing operation in volume about 25% of the total charge and containing about 65% of solid phase by weight. The liquor is cooled so that when mixed with the foots, the liquor will have a temperature of about 115° F. which is reduced by circulation of water through the water jacket (or coils if the crystallizer is provided with coils instead of a jacket) to about 70° at the end of the crystallizing period.

The crystallizing period, however, is considerably shorter than has been required heretofore. The massecuite will reach the centrifuging stage, that is the stage at which the crystals are so close together that further crystallization with agitation would involve a detrimental rubbing of the crystals with each other, in about three days instead of the usual five to five-and-a-half days. This is due to the absence of the soluble salts which, under the old process were produced by neutralization and to the elimination of acidic matter productive of polymerized colloids which, according to the present invention, is removed by the acid and colloid eliminating cell 7.

The massecuite from crystallizer 12 is discharged to centrifugal 13 where, after being purged of most of the mother liquor, the body of sugar is washed with water entering at 14, the wash water being discharged at 15, and preferably returned to the process at some suitable point as is common practice. The yield of fresh sugar may be from 55% to 58% of the dry substance in the liquor entering the crystallizer.

The first greens discharged from centrifugal 13 containing about 65%–70% dextrose and 0.8% ash, are refined, concentrated and cooled as indicated at 16, the concentration being preferably to 40°–41° Baumé. This liquor is crystallized in the second crystallizer 17 under conditions substantially the same as the crystallizing conditions in the first crystallizer 12, except for the higher Baumé and except that the crystallizing period is about 6 days (5–7 days). The liquor entering the second crystallizer, under previous practice not involving reconversion of first greens, contained ordinarily about 4.0% of ash and a considerably greater quantity of colloids; and, as a consequence, the crystallization in the second crystallizer required about 10 days instead of 6 or 7 days.

The massecuite from the second crystallizer 17 is introduced into the centrifugal machines 18. After removal of most of its mother liquor the sugar is washed. This second sugar, because of its low ash content and, particularly, because of its white color, will ordinarily have a quality, both as to purity and color, which will permit it to be sold as a high grade dextrose sugar. Obviously, this second sugar might be melted and returned to the process as has been customary, heretofore, and as is shown in the Copland patent above referred to.

The second greens from centrifuge 18 are reconverted at 19 under acid, density and temperature conditions substantially as specified in the before-mentioned Copland patent, to give a dextrose content of about 85%, the introduction of acid being indicated at 20. The reconverted liquor is then subjected to an acid and colloid eliminating operation at 21 similar to that above described and indicated at 7 on the flow sheet. The ash content of the liquor will be about 1.4% instead of the 8% ash in the hydrol from the second centrifugal of the process in accordance with the Copland patent. This low ash content and its relatively high dextrose content make it profitable and possible to subject the liquor to a third crystallization. Consequently, the liquor from the acid and colloid operation 21 is refined, concentrated and cooled at 22, the concentration being to about 40°–41° Baumé, and is introduced into the third crystallizer 23 where the crystallizing conditions are substantially the same as in the second crystallizer 17, except that the crystallizing period is ordinarily about seven days. The massecuite from crystallizer 23 is centrifuged at 24 and the third sugar is either washed with water and sold as a second grade dextrose sugar which, because of its slight color will be not quite up to the standard of a high grade crystalline dextrose; or, with or without washing, it may be melted and returned to the earlier steps of the process at some suitable point.

The third greens from the centrifuge 24 will ordinarily contain about 2.8% ash (2.6%–3.2%). As this amount of ash is likely to interfere with a further crystallizing operation, or is undesirable in the hydrol, the third greens are preferably subjected to a base removal operation with a material of the Catex type. This operation is indicated at 25. The base removing substance will have to be regenerated at intervals by acid introduced at 26 and discharged as a salt at 27. The resultant liquor has a pH of about 1.5–1.8, and, therefore, the liquor from the step 25 is subjected to another acid eliminating operation at 28 which does not differ from the acid removing operations as heretofore described on the flow sheet at 7 and 21. The liquor from the acid removal operation 28 may have a pH of about 5 and contains 0.005% of ash. It may be sold as hydrol; or it may be returned to the third crystallization at 23 as indicated by the dotted line 29, in which case the process will be a cyclic process; or it may be refined, concentrated and cooled at 30 and subjected to a fourth crystallization at 31, with or without reconversion. The crystallizing conditions will be substantially the same as in the third crystallizer 23 except that the density will be about 41.5° Baumè, and the crystallizing time about eight or nine days. The massecuite is then centrifuged at 32, producing a fourth sugar and a final hydrol.

It will be understood that the process as above described, which is purely illustrative and typical, will be subject to many modifications without departure from the principles of the present invention. Any number of crystallizing operations may be employed. The base removal step followed by acid removal may be employed at any stage of the process where removal of ash is desirable.

The advantages of the present invention, as applied to the production of high purity crystalline dextrose, may be summed up as follows: whiter and more lustrous crystalline products, particularly second and third sugars, second sugars being practically as white as first sugars heretofore produced; higher purity products from the crystallizations following the first crystallization; shorter crystallization periods involving a very considerable economy in crystallizers; increase in total yield from a given amount of converter liquor, from about 82%, which had been customary, to about 90% dextrose on the basis of dextrose dry substance in the converter liquor; a reduced amount of bone black or other adsorption material necessary for the treatment of converter liquor and mother liquors for removal of color; and a higher quality of hydrol due to the absence of any substantial quantity of ash.

I claim:

1. Process which comprises: first treating a liquor resulting from the acid conversion of starch, with bentonite to remove colloidal matter; then bringing said liquor into contact with an acid absorbent resin to eliminate acidic material.

2. Process which comprises: first treating a liquor resulting from the acid conversion of starch, with bentonite to remove colloidal matter; then treating the liquor with activated vegetable carbon to remove color; and thereafter bringing the liquor into contact with an acid absorbent resin.

3. In the production of high purity crystalline dextrose from a starch converted dextrose solution the treatment of the solution (1) with a coagulant of colloidal matter followed by the removal of such matter, said coagulant consisting essentially of bentonite; (2) with an acid absorbent resin to eliminate acid; (3) with an organic base removing resin to bring about substitution of an acid for the salt in the solution; and (4) with an acid absorbent resin.

4. In the process for the production of dextrose involving acid hydrolyzing dextrose polymers to yield a liquor containing dextrose, acidic material and salts and subjecting said liquor to repeated crystallizations: the improvement which comprises eliminating acidic material from said liquor by contacting said liquor with an acid absorbent resin, and as the proportion of salts to dextrose in said liquor increases eliminating salts therefrom by subjecting the liquor to contact with a hydrogen-base exchanger and then with an acid absorbent resin.

5. Process which comprises: first-treating a liquor resulting from the acid conversion of starch with bentonite to remove colloidal matter; then bringing said liquor into contact with an acid absorbent resin to eliminate acidic material, said acid absorbent resin corresponding to the formula R—N—X wherein N stands for nitrogen, X for 0 to 2 atoms of hydrogen, and R for a member of the class consisting of alkyl, aryl, aralkyl and cyclic groups, substituted and unsubstituted, and combinations of these groups, which acid absorbent resin is inert to dextrose and of sufficiently high molecular weight to be capable of reacting with acid in the liquor to form insoluble material.

6. Process which comprises: first treating a liquor resulting from the acid conversion of starch, with bentonite to remove colloidal matter; then treating the liquor with activated vegetable carbon to remove color; and thereafter bringing the liquor into contact with an acid absorbent resin for the purpose of eliminating acidic material from the liquor, said acid absorbent resin corresponding to the formula R—N—X wherein N stands for nitrogen, X for 0 to 2 atoms of hydrogen, and R for a member of the class consisting of alkyl, aryl, aralkyl and cyclic groups, substituted and unsubstituted, and combinations of these groups, which acid absorbent resin is inert to dextrose and of sufficiently high molecular weight to be capable of reacting with acid in the liquor to form insoluble material.

7. Process according to claim 4 wherein said acid absorbent resins respond to the formula

wherein N stands for nitrogen, X for 0 to 2 atoms of hydrogen, and R for a member of the class consisting of alkyl, aryl, aralkyl and cyclic groups, substituted and unsubstituted, and combinations of these groups, which acid absorbent resins are inert to dextrose and of sufficiently high molecular weight to be capable of reacting with acid in the liquor to form an insoluble salt; and wherein said hydrogen-base exchanger responds to the formula

wherein R stands for a member of the class consisting of alkyl, aryl, aralkyl and heterocyclic groups; O for oxygen; X for a member of the group consisting of sulfur and phosphorus, in the form of the oxygenated radical; H for ionizable hydrogen; and $z, w, v$ for whole numbers.

8. Process which comprises treating a liquor resulting from the acid conversion of starch with an acid absorbent resin to eliminate acid; and thereafter treating the liquor with a hydrogen-base exchanger to bring about substitution of acids for salts in the liquor; and then treating the liquor with an acid absorbent resin.

9. Process according to claim 3 wherein the acid absorbent resins respond to the formula

wherein N stands for nitrogen, X for 0 to 2 atoms of hydrogen, and R for a member of the class consisting of alkyl, aryl, aralkyl and cyclic groups, substituted and unsubstituted, and combinations of these groups, which acid absorbent resins are inert to dextrose and of sufficiently high molecular weight to be capable of reacting with acid in the solution to form an insoluble salt; and wherein the organic base removing resin responds to the formula $$z(RO_w X_v)H$$

wherein R stands for a member of the class consisting of alkyl, aryl, aralkyl and heterocyclic groups; O for oxygen; X for a member of the group consisting of sulfur and phosphorus, in the form of the oxygenated radical; H for ionizable hydrogen; and $z, w, v$ for whole numbers.

SIDNEY M. CANTOR.